United States Patent
Beijar et al.

(10) Patent No.: US 10,880,942 B2
(45) Date of Patent: Dec. 29, 2020

(54) CONNECTIVITY MANAGEMENT MECHANISM FOR MULTI-HOP CAPILLARY NETWORKS

(71) Applicant: Telefonaktiebolaget LM Ericsson (publ), Stockholm (SE)

(72) Inventors: Nicklas Beijar, Kirkkonummi (FI); Oscar Novo Diaz, Helsinki (FI)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/574,396

(22) PCT Filed: Dec. 8, 2015

(86) PCT No.: PCT/EP2015/079024
§ 371 (c)(1),
(2) Date: Nov. 15, 2017

(87) PCT Pub. No.: WO2016/184531
PCT Pub. Date: Nov. 24, 2016

(65) Prior Publication Data
US 2018/0139796 A1 May 17, 2018

Related U.S. Application Data

(60) Provisional application No. 62/163,590, filed on May 19, 2015.

(51) Int. Cl.
*H04W 40/22* (2009.01)
*H04W 76/16* (2018.01)
(Continued)

(52) U.S. Cl.
CPC ............ *H04W 76/16* (2018.02); *H04W 4/80* (2018.02); *H04W 40/24* (2013.01); *H04W 48/16* (2013.01);
(Continued)

(58) Field of Classification Search
None
See application file for complete search history.

(56) References Cited

U.S. PATENT DOCUMENTS

2008/0075028 A1* 3/2008 Park ...................... H04L 45/122
370/311
2009/0109868 A1 4/2009 Chen et al.
(Continued)

OTHER PUBLICATIONS

Clausen, T., et al. "Generalized Mobile Ad Hoc Network (MANET) Packet/Message Format," Network Working Group, Request for Comments: 5444, Category: Standards Track, 4 Feb. 2009, pp. 1-65.
(Continued)

*Primary Examiner* — Kodzovi Acolatse
*Assistant Examiner* — The Hy Nguyen
(74) *Attorney, Agent, or Firm* — Coats & Bennett, PLLC

(57) ABSTRACT

The present disclosure relates to a method and apparatus for managing connectivity between a cellular network 15 (in which device communicate via long-range wireless technology) and devices in one or more multi-hop capillary networks 16 (in which devices communicate via short-range wireless technology). One or more gateways 24 connect the one or more multi-hop capillary networks 16 to the cellular network 15 and communicates via short-range and long-range wireless technology. A management node 28 determines a topology of the capillary network(s) 16 based on received reachability information. The topology indicates which devices are within communication range of other devices and gateways in the capillary network 16. The management node 28 makes determinations based on the topology and transmits notifications to a first device 26B within communication range of the one or more gateways 24 and to a second device 26A not within communication range of any gateway.

16 Claims, 13 Drawing Sheets

(51) Int. Cl.
  *H04W 40/24* (2009.01)
  *H04W 76/20* (2018.01)
  *H04W 4/80* (2018.01)
  *H04W 48/16* (2009.01)
  *H04W 88/04* (2009.01)
  *H04W 88/06* (2009.01)
  *H04W 84/18* (2009.01)

(52) U.S. Cl.
  CPC ............ *H04W 76/20* (2018.02); *H04W 40/22* (2013.01); *H04W 84/18* (2013.01); *H04W 88/04* (2013.01); *H04W 88/06* (2013.01); *Y02D 30/70* (2020.08)

(56) References Cited

U.S. PATENT DOCUMENTS

| | | | | |
|---|---|---|---|---|
| 2012/0047551 | A1* | 2/2012 | Pattar | H04W 4/00 726/1 |
| 2012/0294187 | A1 | 11/2012 | Chau et al. | |
| 2013/0016649 | A1* | 1/2013 | Damnjanovic | H04W 88/04 370/315 |
| 2013/0142059 | A1* | 6/2013 | Di Girolamo | H04W 88/16 370/252 |
| 2013/0188515 | A1* | 7/2013 | Pinheiro | H04L 67/16 370/254 |
| 2015/0124625 | A1* | 5/2015 | Aldrin | H04W 40/12 370/238 |
| 2016/0323182 | A1* | 11/2016 | Segal | H04L 45/56 |
| 2017/0251428 | A1 | 8/2017 | Jimenez et al. | |

OTHER PUBLICATIONS

Sachs, J., et al. "Capillary networks—a smart way to get things connected," Ericsson Review, 9 Sep. 2014, Ericsson, Stockholm, Sweden, pp. 1-8.

Clausen, T., et al. "Mobile Ad Hoc Network (MANET) Neighborhood Discovery Protocol (NHDP)," Internet Engineering Task Force (IETF), Request for Comments: 6130, Category: Standards Track, ISSN: 2070-1721, Apr. 1, 2011, pp. 1-81.

Li, H., et al, "Multihop communications in future mobile radio networks," Personal, Indoor and Mobile Radio Communications, 2002, 13th Annual IEEE International Symposium, Sep. 15, 2002, Piscataway, NJ, pp. 54-58.

Zhao, L., et al., "Novel QoS-Aware Gateway Centralized Multi-hop Routing for Wireless Mesh Networks," 2010 10th IEEE International Conference on Computer and Information Technology (CIT 2010), Piscataway, NJ, Jun. 29, 2010, XPO31757799, pp. 336-342.

* cited by examiner

CONNECTIVITY MANAGEMENT MECHANISM FOR MULTI-HOP CAPILLARY NETWORKS

TECHNICAL FIELD

The present disclosure relates to capillary networks, and more particularly to managing and/or establishing connectivity between a multi-hop capillary network and a cellular network.

BACKGROUND

The market for connected devices is growing tremendously. Though there are industry standards available that cater for the connectivity requirements of the devices in the Internet, those established standards are not particularly useful for the management of the connectivity of a large and growing category of connected devices and constrained networks: those with limited network bandwidth and low production costs.

Hence, new efforts were undertaken to create mechanisms and architectures that also cater to the needs of 'constrained' devices and networks. One of the solutions to cater to those needs are "capillary networks."

A capillary network is a local network that uses short-range radio-access technology (such as Wi-Fi or BLE) to provide local connectivity to things and devices. Capillary networks leverage the key capabilities of cellular networks: ubiquity, integrated security, network management and advanced backhaul connectivity. A capillary network is interconnected to a cellular network through one or more intermediate nodes, called "capillary gateways."

The physical distance between a device and a gateway is limited by the radio range of the short-range network. To allow longer distances, multi-hop or mesh networking may be used. Devices that do not have a gateway within reach may use another device as relay. This is a concept known as ad hoc networking.

In large-scale deployments, the majority of the devices will connect to a network (e.g. a cellular network) out of range of the capillary network through a capillary gateway either directly or through another node. Currently, a device automatically selects a capillary gateway by using gateway selection mechanisms. Those mechanisms try to make the selection of a gateway as optimal as possible.

However, the decision-making process—what gateway a device chooses for connectivity—needs to be fully automated and needs to take into consideration a number of network and gateway properties. Further, there is no guarantee that all the devices may connect directly to a capillary gateway. If a device is out of reach of any capillary gateways and cannot connect directly to the cellular network, it will become isolated without any connectivity.

SUMMARY

According to various aspects of the present disclosure, methods for managing the connectivity of devices in one or more capillary networks are disclosed. Intermediate devices in a capillary network may serve as relays for isolated devices out of range of a capillary gateway to enable the isolated devices to still connect to a gateway. A management node (e.g. a central node in the cellular network) manages the connectivity of the isolated devices, including what gateway a device should use for connectivity. The management node bases its connectivity decisions on, for instance, network parameters, including the quality of the cellular radio link and the load in the cellular cell that a gateway is connected to, and/or gateway parameters, including the amount of power a battery-operated gateway has left or the different levels of backhaul connectivity of a gateway. The gateways may provide connectivity from the one or more capillary networks, which uses short-range radio access technology (e.g. Wi-Fi or BLE), to a cellular network, which uses long-range radio access technology (e.g. LTE, W-CDMA, GSM).

According to one aspect of the present disclosure, a method of managing connectivity between a cellular network and a plurality of devices in one or more multi-hop capillary networks is disclosed. One or more gateways connect the one or more multi-hop capillary networks to the cellular network. The method is implemented in a management node. The method comprises determining, at the management node, a topology of the one or more multi-hop capillary networks based on reachability information received from at least one of the plurality of devices. The topology indicates which devices are within communication range of other devices and gateways in the one or more capillary networks. The plurality of devices uses short-range radio access technology. The cellular network uses long-range radio access technology. The one or more gateways use long-range radio access technology and short-range radio access technology. For a first device that is within communication range of at least one gateway, the method comprises determining, at the management node, which gateway the first device should use to connect to the cellular network based on the determined topology and transmitting a notification to the first device that indicates the determined gateway. For a second device that is not within communication range of any gateway, the method comprises determining, at the management node, a set of one or more of the plurality of devices, including at least one device that is within communication range of at least one gateway, to relay traffic between the second device and a gateway, based on the determined topology and transmit a notification to the second device that indicates the determined set.

In one or more embodiments, the reachability information received from a given device of the plurality of devices comprises an identifier of each node of which the given device is within communication range. An identified node is one of the plurality of devices or one of the one or more gateways.

In one or more embodiments, a method implemented in the management node further comprises, if the reachability information from a given device is received via a current gateway that is different than the determined gateway for the device, transmitting a request to the device to disconnect from the current gateway and connect to the cellular network via the determined gateway.

In one or more embodiments, the determining which gateway the first device should use to connect to the cellular network is further based on constraint information indicating one or more properties of the first device and/or constraint information indicating one or more properties of the at least one gateway of which the first device is within communication range.

In one or more embodiments, the determining of the set of one or more of the plurality of devices to relay traffic is further based on constraint information indicating one or more properties of the devices in the set and/or constraint information indicating one or more properties of at least one gateway that is within communication range of a device in the set.

In one or more embodiments, the determining which gateway the first device should use to connect to the cellular network, the determining of the set of one or more of the plurality of devices to relay traffic, or both, is further based on a policy of the management node that comprises a set of rules defining how to connect the plurality of devices to the cellular network based on the constraint information.

In one or more embodiments, a method implemented in the management node further comprises subsequently re-determining a gateway that a given device should use to connect to the cellular network, or re-determining the set of devices to relay traffic between a given device and one of the gateways, based on receiving updated reachability and/or updated constraint information.

In one or more embodiments, a method implemented in the management node further comprises receiving a notification indicating that a given device has detected a beacon advertising that the second device needs connectivity. Based on the notification, the method comprises transmitting a request to the given device to act as a relay for the second device. The given device is one of the plurality of devices that is connected to one of the gateway nodes either directly, or via one or more of the plurality of devices acting as relays.

In one or more embodiments, the one or more multi-hop capillary networks include a plurality of gateways. A method implemented in the management node further comprises determining an alternate gateway from the plurality of gateways that the first device may choose from to connect to the cellular network. A notification that indicates the determined gateway also indicates the alternate gateway.

In one or more embodiments, a method implemented in the management node further comprises, for the second device, determining an alternate set of one or more of the plurality of devices that the second device may choose from to relay traffic to a gateway. A notification that indicates the set of devices to relay traffic also indicates the alternate set.

In one or more embodiments, a method implemented in the management node further comprises determining, based on the topology, that one of the plurality of devices should switch from relaying traffic for another device to not relaying that traffic, or vice versa, and transmitting a command to that device indicating that the device should perform said switch.

According to another aspect of the present disclosure, a method is disclosed of establishing connectivity to a cellular network from a given one of a plurality of devices in one or more multi-hop capillary networks. The method is implemented in the given device. The method comprises connecting to the cellular network through a default gateway of the one or more gateways. The method comprises assisting a management node to determine whether the given device should re-connect to the cellular network through a different one of the one or more gateways, by transmitting reachability information to the management node that indicates reachability between the given device and one or more of the plurality of devices, the one or more gateways, or both. The plurality of devices uses short-range radio access technology. The cellular network uses long-range radio access technology. The one or more gateways use long-range radio access technology and short-range radio access technology.

In one or more embodiments, the reachability information includes identifiers for each node of which the given device is within communication range. Each identified node is one of the one or more gateways or one of the plurality of devices.

In one or more embodiments, the given device further assists the management node to determine whether the given device should re-connect to the cellular network through a different gateway by transmitting constraint information that indicates one or more properties of the given device.

In one or more embodiments, connecting to the cellular network through the default one of the plurality of gateways comprises connecting indirectly via a first device in the capillary network and assisting a management node to determine whether the given device should re-connect to the cellular network through a different one of the plurality of gateways comprises assisting a management node to determine whether the given device should connect to the cellular network through the default one via a second device in the capillary network.

In one or more embodiments, the method implemented in the given device further comprises transmitting the reachability and/or constraint information to the management node either periodically or based on a detected change in existing reachability and/or existing constraint information for the given device.

In one or more embodiments, the method implemented in the given device further comprises receiving a beacon from another one of the plurality of devices that is not connected to the cellular network and is not within communication range of any of the gateways. The method comprises assisting the management node to determine whether the given device should serve as a relay for the device from which the beacon was received by transmitting a notification to the management node indicating that the beacon has been received.

In one or more embodiments, the default gateway is different than the determined gateway and the method implemented in the given device further comprises receiving a request from the default gateway to disconnect from the default gateway and connect to the cellular network via the determined gateway; disconnecting from the default gateway; and connecting to the determined gateway.

According to another aspect of the present disclosure, a method is disclosed of establishing connectivity to a cellular network from a given one of a plurality of devices in one or more multi-hop capillary networks. One or more gateways connect the one or more multi-hop capillary networks to the cellular network. The method is implemented in the given device. The method comprises advertising a need for connectivity by transmitting one or more beacons. The method comprises establishing a connection to at least one gateway of the one or more gateways through one or more intermediate ones of the plurality of devices that respond to the one or more beacon signals by reporting the advertised need to a management node. The management node centrally coordinates device connectivity in the one or more multi-hop capillary networks. The plurality of devices uses short-range radio access technology. The cellular network uses long-range radio access technology. The one or more gateways use long-range radio access technology and short-range radio access technology.

In one or more embodiments, the given device assists the management node to determine whether the given device should re-connect to the cellular network through one or more different intermediate devices by transmitting reachability information to the management node that indicates that identifies other nodes of which the given device is within communication range. The identified nodes are ones of the plurality of devices.

In one or more embodiments, the given device uses a Mobile Ad Hoc Network (MANET) Neighborhood Discovery Protocol (NHDP) to send the beacon signals. In the same or other embodiments, each beacon signal is a message that contains a plurality of fields. The plurality of fields includes one or more connectivity fields for advertising a need for connectivity and one or more propagation fields indicating to a recipient of the message that the message should not be retransmitted.

In embodiments of one or more of the methods discussed above, the constraint information indicates one or more of a battery level, load level, cost, uplink reliability, maximum bandwidth, latency, mobility, and administrative preference for a device or gateway.

In embodiments of one or more of the methods discussed above the reachability information further comprises either a signal strength or a signal quality metric measured by the given device for each identified node.

In one or more embodiments of the methods discussed above the long-range radio access technology comprises one or more 3rd Generation Partnership Project (3GPP) radio access technologies, and the short-rage radio access technology comprises one or more of Wi-Fi, Bluetooth, Bluetooth Low Energy, and Zigbee.

One or more embodiments also include a management node or a given device configured to implement one or more of the methods discussed above. One or more embodiments also include a computer program comprising instructions which when executed on at least one processor of a management node or a given device cause the at least one processor to carry out one or more of the methods discussed above. One or more embodiments also include a carrier containing the computer program. The carrier is one of an electronic signal, optical signal, radio signal, or computer readable storage medium Of course, the present disclosure is not limited to the above features and advantages. Indeed, those skilled in the art will recognize additional features and advantages upon reading the following detailed description, and upon viewing the accompanying drawings.

DETAILED DESCRIPTION

Figure 1:
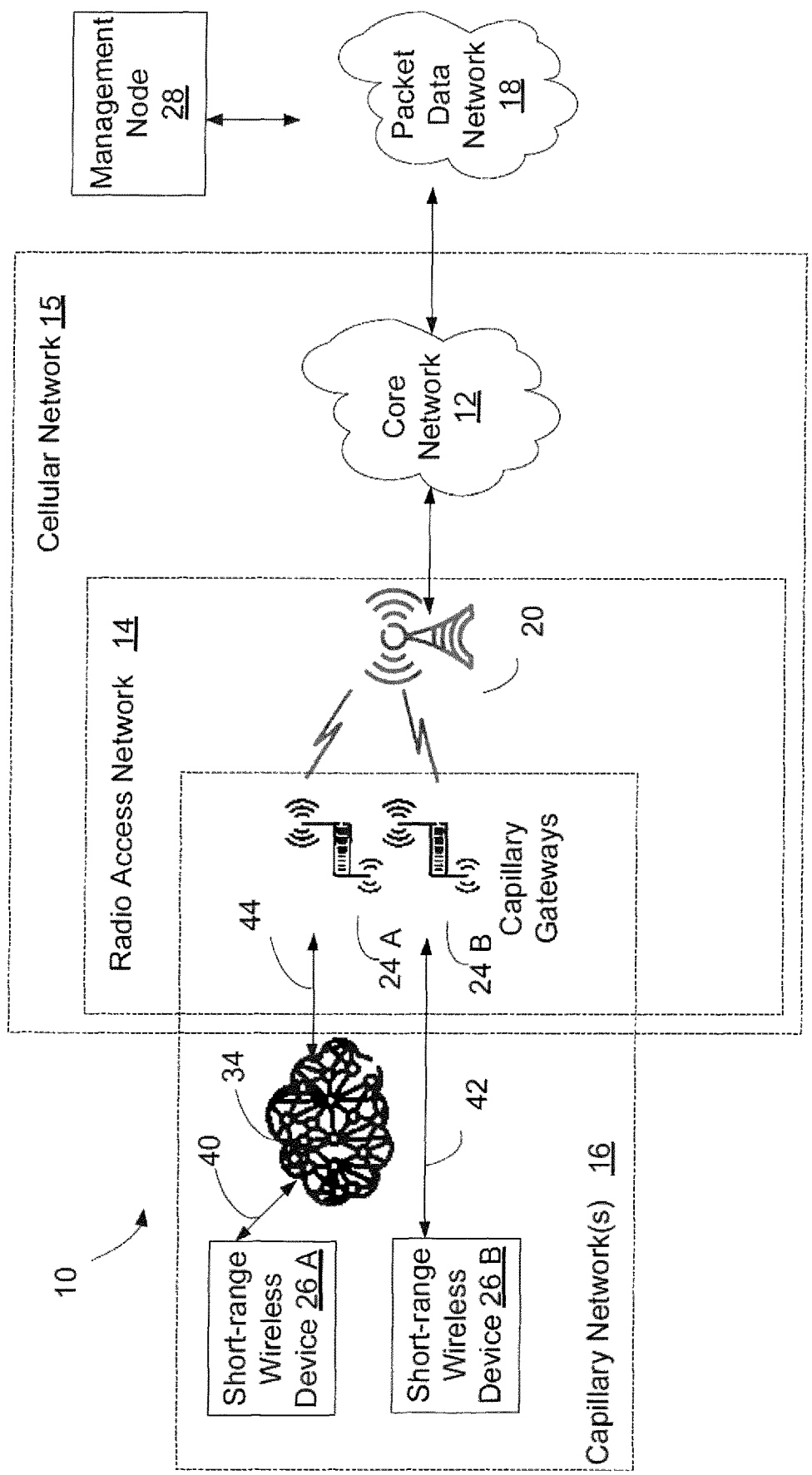
FIG. 1 depicts an example wireless communication network that includes a management node and devices in accordance with embodiments herein.

FIG. 1 illustrates an example wireless communication network 10 that includes a cellular network 15 and one or more capillary networks 16. The cellular network includes a core network 12 and a radio access network (RAN) 14. The core network 12 and RAN 14 are part of a cellular network 15 that uses long-range radio access technology. For instance, the RAN 14 includes a base station 20 configured to communicate with devices using long-range radio access technology (e.g. LTE, W-CDMA, GSM).

The one or more capillary networks 16 include one or more capillary gateways (e.g. gateways 24A and 24B) that connect the capillary network(s) 16 to the cellular network 15. Specifically, capillary network(s) 16 includes devices (e.g. device 26A and/or 26B) configured to communicate using short-range access technology (e.g. Wi-Fi or BLE). A capillary gateway uses both short-range radio access technology to communicate with devices of the capillary network(s) 16 and long-range radio access technology to communicate with devices of the RAN 14. In this way, a capillary gateway connects devices in the capillary network(s) 16 and the cellular network 15.

The capillary network(s) 16 are multi-hop in nature. To support the multi-hop environment, each device at any given time has one of two roles: a leaf device or a relay device. A device that cannot directly reach a gateway (e.g. because the device is not within communication range of the gateway) may connect to another device that serves as an access point and forwards the device's traffic towards a gateway. A device with that capability is called a relay device. A device that does not serve as an access point for other devices is called a leaf device. FIG. 1 for instance shows device 26A as being a leaf device that indirectly connects to gateway 24A via one or more relay devices 34, and shows device 26B as being a leaf device that connects directly to gateway 24B. Generally, therefore, the capillary network(s) 16 include a plurality of devices 26 that connect with one or more gateways 24 either directly or through one or more intermediate ones of the devices serving as relays.

Figure 2:
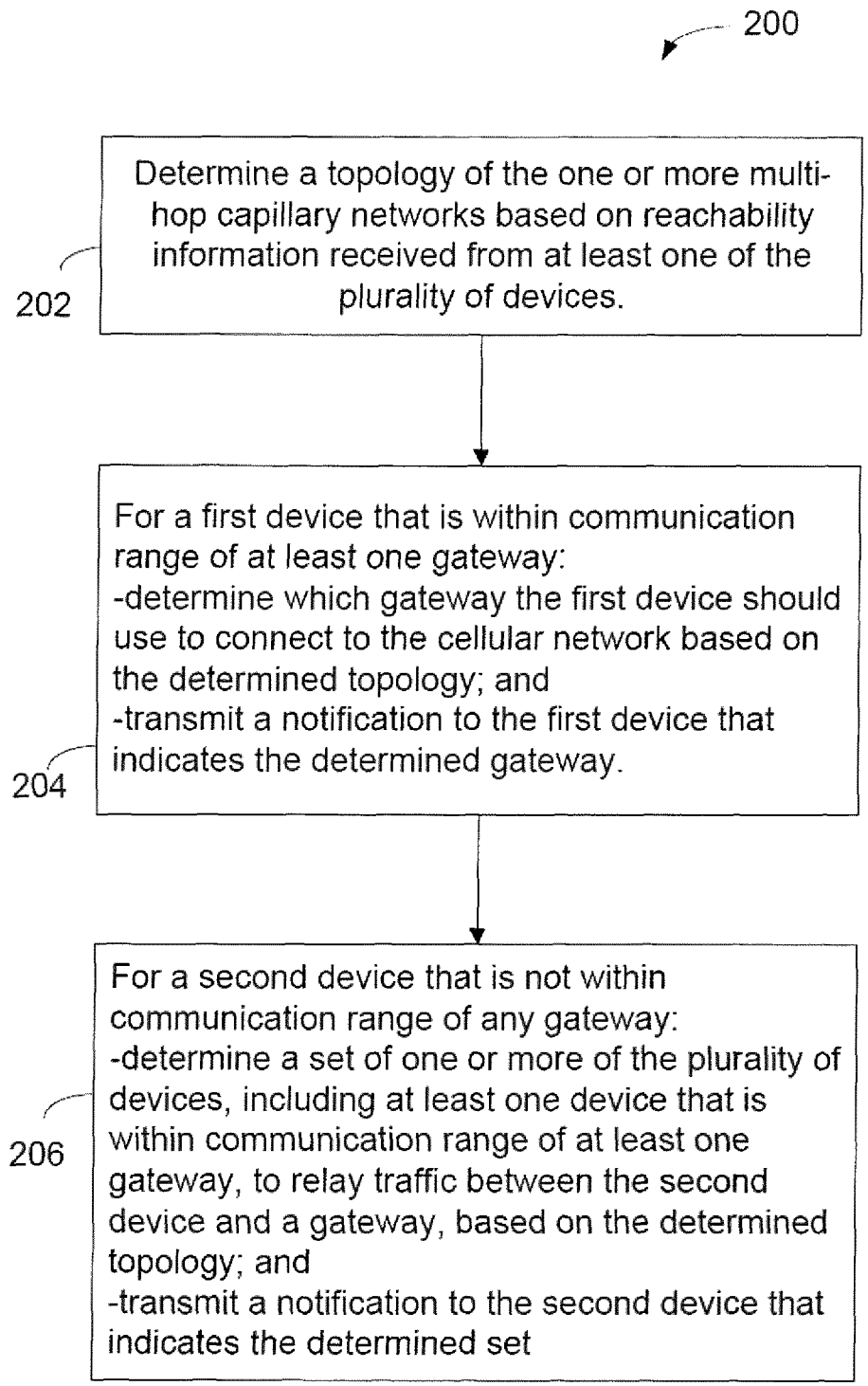
FIG. 2 depicts an example method implemented by a management node in accordance with embodiments herein.

A management node 28 manages the connectivity of devices in the capillary network(s) 16. In doing so, the management node 28 configures each device in the capillary network(s) 16 to connect to a gateway, either directly or indirectly via one or more relay devices, so that the device is ultimately connected to the cellular network 15. In some embodiments, therefore, the management node 28 advantageously manages the connectivity of not only one or more devices within communication range of a gateway, but also one or more devices that are not within communication range of any gateway. FIG. 2 illustrates a method 200 performed by the management node 28 according to one or more of these embodiments.

As shown in FIG. 2, the method 200 at the management node 28 includes determining a topology of the capillary network(s) 16 (Block 202). This determination is based on reachability information received from one or more devices of the capillary network(s). The received reachability information in some embodiments for example includes an identifier of each node of which the given device is within communication range. For example, the management node 28 may receive identifiers for relay devices 34 that are within communication range of device 26A.

Having determined this topology, the method 200 at the management node 28 further entails, for a first device 26B within communication range of a gateway, determining which capillary gateway the first device 26B should use to connect to the cellular network 15 based on the determined topology. The management node 28 may for instance determine that the first device 26B should use gateway 24B to connect to the cellular network 16. Regardless, the management node 28 transmits a notification to the first device that indicates the determined gateway. (Block 204).

The method 200 further includes, for a second device 26A that is not within communication range of any gateway, determining a set of one or more relay devices 34 within the capillary network(s) 16 to relay traffic between the second device 26A and a gateway 24A. This set includes at least one device that is within communication range of at least one gateway 24A. The management node 28 makes this determination based on the topology. The management node 28 then transmits a notification to the second device 26A that indicates the determined set (Block 206). The management node 28 in at least some embodiments therefore manages the connectivity of this second device 26A, even though that node is not itself within communication range of any gateway.

In at least some embodiments, the management node 28 is a centralized control node. The management node 28 in this capacity centrally sets up and manages the connectivity between devices and gateway(s) in the capillary network(s) 16. This centralized control approach in some embodiments enables the management node 28 to select the optimal gateway for each device in the capillary network(s) 16, no matter whether it is within range of the gateway(s).

From the vantage point of the management node 28, the management node 28 in embodiments considers reachability information and other information (e.g. constraint information) to optimize a communication path through the capillary network(s) 16 to the cellular network 15 for a device. For instance, in FIG. 1 a short-range wireless device is configured to communicate with one or more capillary gateways either directly (e.g. via a direct communication pathway 42) and/or indirectly through one or more intermediate relay devices 34 (e.g. relaying communication via communication pathways 40 and 44). Optimizing a communication path includes chooses an optimal gateway for a device. It may also include selecting which nodes should provide connectivity to other nodes (e.g. selecting which of nodes 34 may relay communication). It may also include selecting which nodes (gateways or relay devices) each device should connect to (e.g. which node 34 or gateway 24A or 24B device 24A should connect to).

An alternative or additional solution to managing connectivity would be to use a routing protocol for some or all of the devices in the capillary network. In other words, the routing protocol would be used to find the routes through the multi-hop capillary network. However, current routing protocols for multi-hop wireless networks in the market are distributed. Thus, they do not provide a centralized approach for managing connectivity. Having a set of devices in the capillary network(s) 16 that are connected via a routing protocol would break the end-to-end view of the management node 28. This would decrease the efficiency of the gateway selection mechanism since the management node would not be able to reach and manage some part or the entire capillary network(s) 16. In contrast, having a purely centralized approach in which all the devices in the capillary network(s) 16 are available to the management node 28 improves the efficiency of the gateway selection mechanism since the management node would be able to reach and manage the entire capillary network(s) 16.

Using a centralized approach, the availability of all the nodes of the capillary network(s) 16 to the management node greatly improves the manageability of the gateways, providing a solution that may be used for all the devices regardless of its proximity to the capillary gateways. In some embodiments, it also provides a solution transparent to the devices which do not have any direct access to the capillary gateways.

Figure 3:
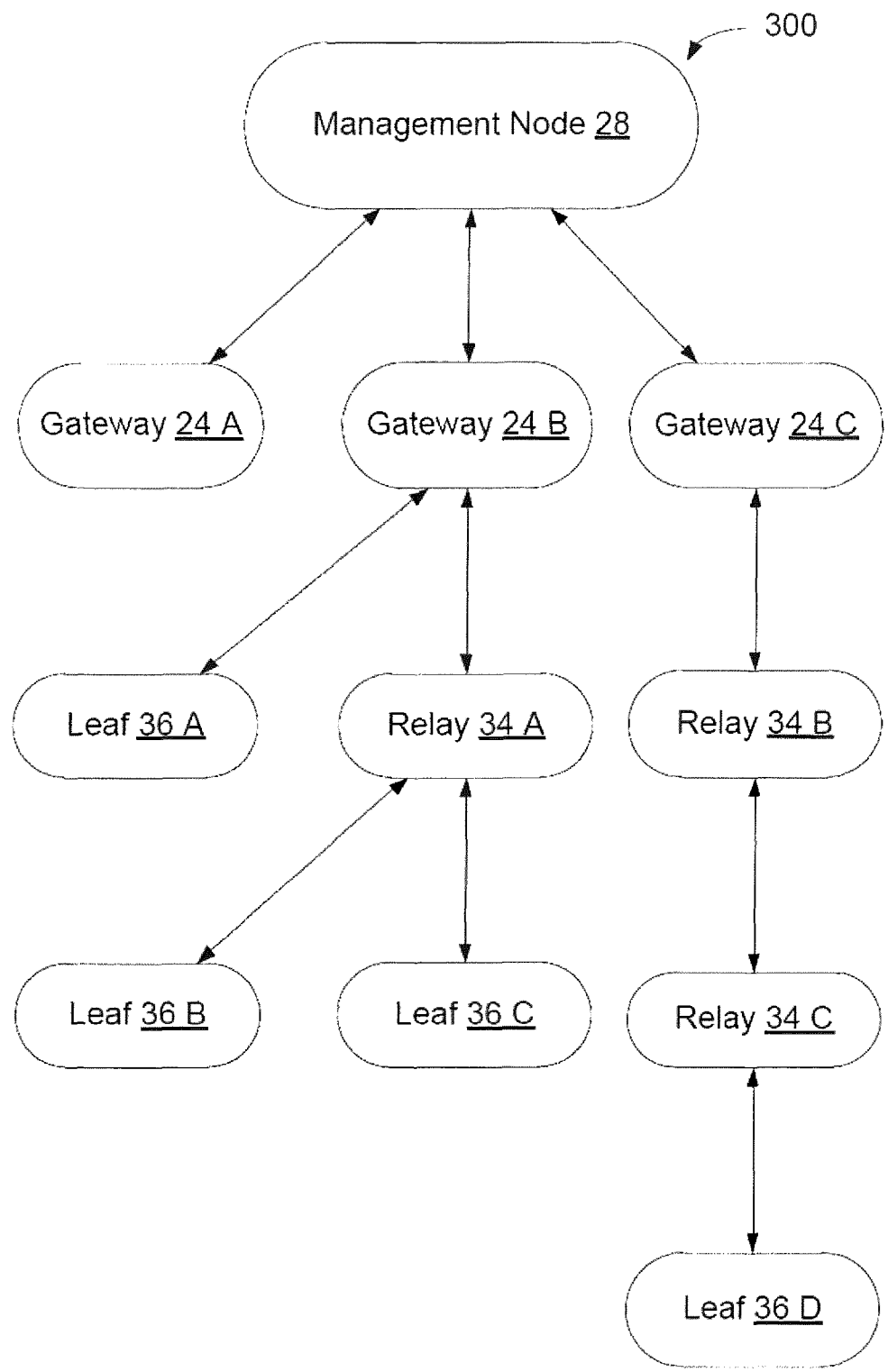
FIG. 3 depicts an example wireless communication network structure that includes a management node and devices in accordance with embodiments herein.

FIG. 3 shows an example wireless communication network structure where a management node 28 manages device connectivity for several gateways (e.g. gateways 24A, 24B and 24C) and devices of capillary network(s) (e.g. relays 34A, 34B and 34C). A purpose of the connectivity management as performed by management node 28 is to set up the connectivity of the devices of a network, so that all devices have connectivity via a capillary gateway. Connectivity creates a tree structure, where a root in the tree is a gateway (e.g. gateway 24A), while the leafs in the tree are the leaf nodes (e.g. leaf 36A), and the intermediate nodes are relay nodes. The tree structure in FIG. 3 denotes the various roles of the devices within the tree structure.

In embodiments, the management node 28 uses various information in making determinations related to the connectivity of the devices within the determined topology. To make determinations or selections, the management node 28 considers the capabilities of the devices and the gateways. For instance, the management node 28 considers information about the network devices (e.g. reachability information and constraint information) in making determinations. The management node 28, in some embodiments, also considers policies or rules in making determinations.

As mentioned above, the management node 28 in embodiments considers reachability information (e.g. method 200 of FIG. 2). The reachability information may be a signal strength or a signal quality metric measured by a given device for a node within communication range of the given device. Hence, the reachability information indicates information about setting up a connection between two devices.

The management node 28 in embodiments also considers constraint information for a given device which includes a measureable property of the device. Constraint information may indicate, as an example, one or more of a battery level, load level, cost, uplink reliability, maximum bandwidth, latency, mobility, and administrative preference for a device or gateway. The management node 28, in embodiments, considers constraint information for multiple devices in making connectivity determinations for a given device.

In some embodiments, the management node 28 makes a determination for a given device to connect to a given gateway (e.g. leaf 26A connects to gateway 24B). The management node 28 makes this determination based on constraint information of the given device (e.g. properties of leaf 26A). Alternatively or additionally, the management node 28 makes this determination based on constraint information of a gateway (e.g. properties of gateway 24B). For a given device the management node 28 in embodiments considers constraint information of other gateways or devices in the network.

As an example, management node 28 considers reachability information and determines that leaf 36A is within communication range of gateway 24A and gateway 24B. The management node 28 then considers constraint information of each of the gateways 24A and 24B. If the battery level of gateway 24A is very low compared to gateway 24B, the management node 28 determines that gateway 24B is the optimal gateway for which leaf 36A should connect.

In some embodiments, the management node 28 makes determinations for a set of devices to relay traffic. The management node 28 determines the set based on constraint information indicating one or more properties of the devices in the set. For instance, the administrative preference for a given device based on its sleeping policy or its security allows it to become a relay and therefore it is allowed to be a part of the set. The management node 28 may also consider constraint information of devices not selected as a relay for the set. For instance, the security policy of a device would not allow it to be a relay, so the management node 28 will not have this device serve in a role other than a leaf role. Additionally or alternatively, the determination of a relay is based on constraint information indicating one or more properties of at least one gateway that is within communication range of a device in the set. For instance, the constraint information of a given gateway indicates it may only relay traffic for a maximum number of devices. The management node 28 would not select a device to relay additional traffic if it would overload the maximum number of allowed devices for that gateway.

In some embodiments, the management node 28 makes determinations based on policies of the management node 28. A policy includes a set of rules defining how to connect the plurality of devices to the cellular network based on the constraint information. In certain embodiments, the management node 28 observes the constraints in the selection of gateways or relay devices according to a policy defined by the administrator. Alternatively or additionally, the rules of the policy indicate how to weight pieces of constraint and/or reachability information. For instance, the policies may indicate whether and in what situation a constraint should be considered at all or what ranking to give different constraints.

In embodiments, the management node 28 makes determinations as to an optimal gateway based on policies of the management node 28. For instance, a policy could require the management node 28 to only consider the battery level of various gateways if the cost to use the gateways is the same.

In embodiments, the management node 28 makes determinations as to whether a given device should relay traffic based on policies of the management node 28. For instance, the management node 28 has a rule that each gateway will only relay traffic for a maximum number of devices.

Once the management node 28 has reachability information, constraint information and policy available, it can, for example, perform a calculation of the optimal connectivity. To enforce this connectivity, it could, for example, send commands to the devices to connect to a given access point. Furthermore, the management node 28 may send commands to a device to switch roles between relay and leaf device. Thus, the management node may force a leaf to become a relay device.

In other examples, management node 28 sends a request to the potential relay device to relay and the relay decides by itself whether it is good for it to be a relay for that network. It might be that its sleeping policy or its security would not allow it to become a relay, and it has to deny an offer or propose another leaf in the network.

Figure 4:
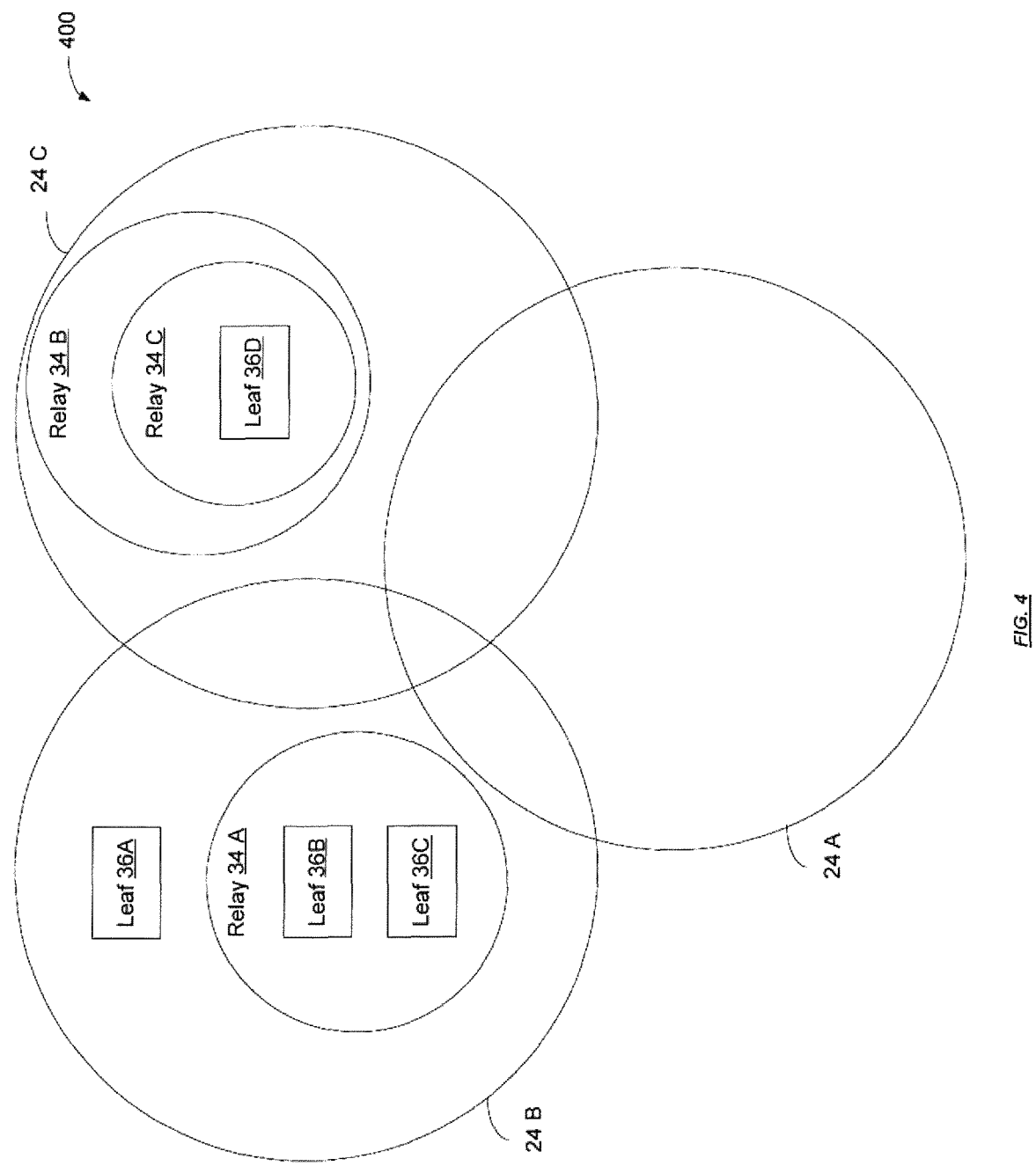
FIG. 4 depicts an example reachability map in accordance with embodiments herein.

In some embodiments, the management node collects information (e.g. reachability and constraint information) and stores it. This collected information may be helpful in learning a current topology for the network. The management node 28 in embodiments organizes this reachability information into a reachability map that indicates a topology for the network. FIG. 4 shows an example reachability map 400 for the tree structure in FIG. 3. A given circle represents the communication range of a given device. A device within the circle is reachable by the device. For instance, Leaf 26A is reachable by gateway 24B, but not reachable by Relay 34A even though Relay 34A is within the communication range of gateway 24B.

The management node 28 may select the proper wireless access point for every device in the capillary network based on reachability information. In case a device has reachability to several gateways or relays, the management node 28 may use constraints of these nodes to define to which of them the device connects.

Alternatively, the management node 28 indicates more than one gateway or relay to which a device may connect. For instance, if a device has reachability to several gateways or relays, the management node 28 selects or determines that more than one of the gateways and/or relays are viable or back-up options to relay communication for a given device.

For example, the management node 28 determines two gateways are viable and the device chooses between the viable gateways. The device is aware of these options, for instance, by a notification that indicates a determined gateway and that indicates an alternate gateway. As another example, if the management node 28 determines two sets of devices to relay traffic for a given device, the management node 28 may send a notification to a device that indicates the determined set and an alternative set.

As another example, the management node 28 provides a back-up to a given device. For example, a given leaf device connects to a relay transparently. Since the leaf device is connecting to another constrained device, there might be the possibility that the relay device is sleeping during certain periods or that the relay disconnects totally from the network. In case one of the relay devices is not available, the management node 28 may provide to the leaf device different relay options in which to connect (e.g. alternative gateways or alternative sets of relay devices).

In embodiments, information (e.g. constraint and reachability information) is reported to the management node (e.g. by devices in the network) so that the management node 28 has an up-to-date view of the network. For instance, a given device may report reachability information to the management node that includes an identifier for a node of which the given device is within communication range. The identifier in embodiments may be unique identifiers or existing identifiers. The identifiers may be different and specific to a given technology. For example, in Wi-Fi, an access point is identified by the combination of Service Set Identifier (SSID) and Basic Service Set Identifier (BSSID). The identifier is used in referring to a given access point or for identifying the reachable access points. In Wi-Fi, the nodes may operate in an ad hoc mode, allowing them to connect to other devices without infrastructure. The Wi-Fi identifiers may therefore be used by the management node 28 in making connectivity determinations.

The management node 28 may use this reported information to make determinations for the network. For instance, if updated information indicates that constraint information or reachability information has changed, in certain embodiments the management node 28 makes the same or different determinations based on the updated information. For instance, the management node 28 re-determines a gateway that a given device should use to connect to the cellular network, or re-determines the set of devices to relay traffic between a given device and one of the gateways based on receiving updated reachability or updated constraint information or both.

The management node 28 may also use the reports to determine whether the current communication pathways conform to the determined communication pathways. For instance, the management node 28 in embodiments receives reachability information from a given device via a current gateway that is different than the determined gateway for the device. Thus, the management node 28 determines that the current communication pathway differs from the determined communication pathway.

In certain embodiments, the reports include a notification indicating that a given device has detected a beacon advertising that a device needs connectivity. The management node 28 based on the notification may transmit a request to the given device to act as a relay for the advertising device.

In embodiments, the management node 28 may suggest or force a device to conform to a determined communication pathway. For instance, the management node 28 transmits a request to the device to disconnect from the current gateway and connect to the determined gateway. In other instances, the management node 28 transmits a command to a device to switch to a different role. For example, a device currently performing a role as a leaf should begin relaying for another device or a device currently performing a role as a relay should no longer relay for another device.

In embodiments, the management node 28 enables individual control of devices in the capillary network(s). Alternative gateway selection mechanisms in a multi-hop network may, instead of managing connectivity to individual nodes, move one branch at a time. Thus, moving one node between the gateways would move all other nodes that use this node as a relay. This makes load distribution difficult or impossible. Embodiments herein improve gateway selection mechanisms so as to allow the management node 28 to move a single node without moving all other nodes that use this node as a relay.

Embodiments herein also include corresponding methods and apparatus for reporting the reachability and/or constraint information. The reported information may be reported periodically or based on a change in the information (e.g. when a new device connects to the network or advertises a desire to connect to the network). Such information assists a management node 28 in making determinations such as the optimal gateway for which a device should connect.

Figure 5:
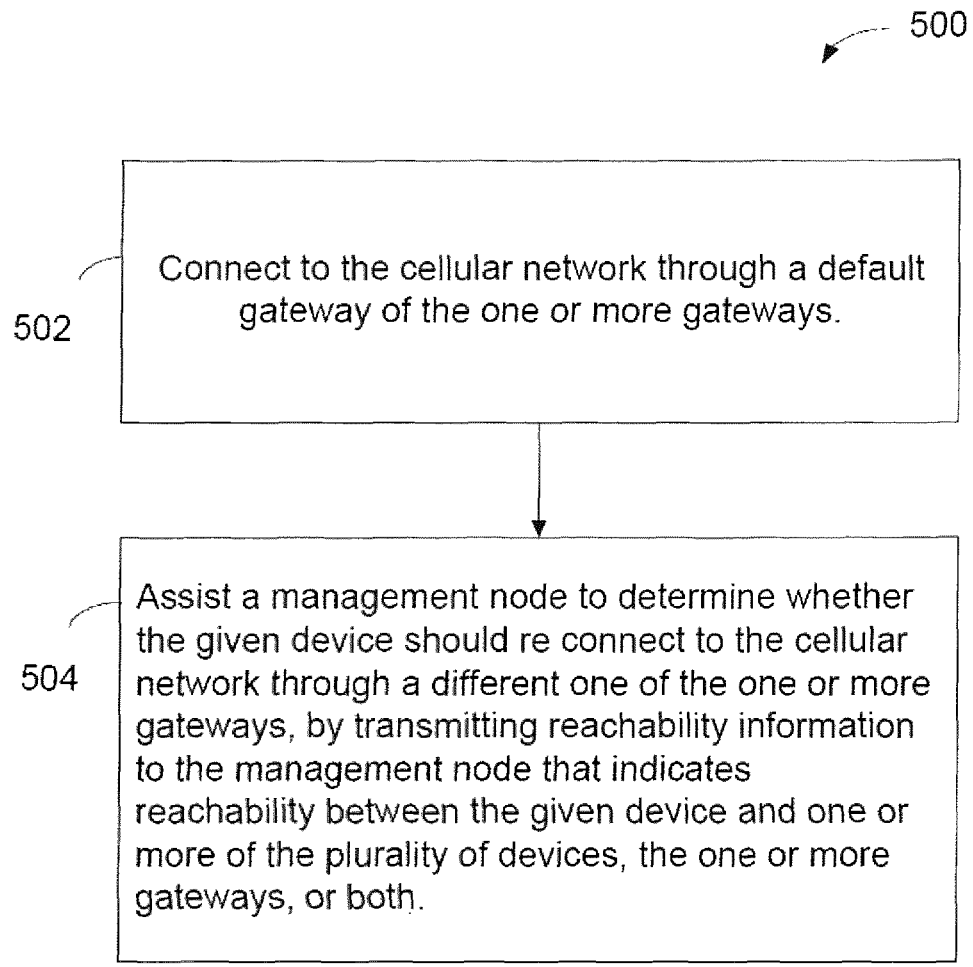
FIG. 5 depicts an example method implemented by a device in accordance with embodiments herein.

FIG. 5 shows an example method implemented by a device (e.g. short-range wireless device 26B of FIG. 1) to assist a management node to determine an optimal gateway (e.g. capillary gateway 24B) to relay traffic for the device. The method includes connecting to the cellular network through a default gateway (e.g. gateway 24B of FIG. 1) of the one or more gateways. (Block 502). The method further includes assisting a management node (e.g. management node 28 of FIG. 1) to determine whether the given device should re-connect to the cellular network through a different one (e.g. gateway 24A of FIG. 1) of the plurality of gateways. (Block 504). The device assists by transmitting or reporting reachability information (e.g. the reachability information explained above) to the management node. The reachability information indicates reachability between the given device and one or more of the plurality of devices, the one or more gateways, or both.

Based on the assistance information transmitted from the given device, the management node may determine that the given device should stay connected to the default gateway or connect to a different gateway. The management node may also determine that the given device should stay connected to the default gateway but reach that default gateway indirectly through another device.

If the management node determines that a change in one or more communication pathways is preferred, the management node transmits a request for the given device to disconnect from the default gateway and connect via the determined gateway. In response, the device may disconnect from the default gateway and connect to the determined gateway.

The given device may also transmit other assistance information in addition to the reachability information such as constraint information (e.g. constraint information as explained above) indicating properties of the given device.

Figure 6:
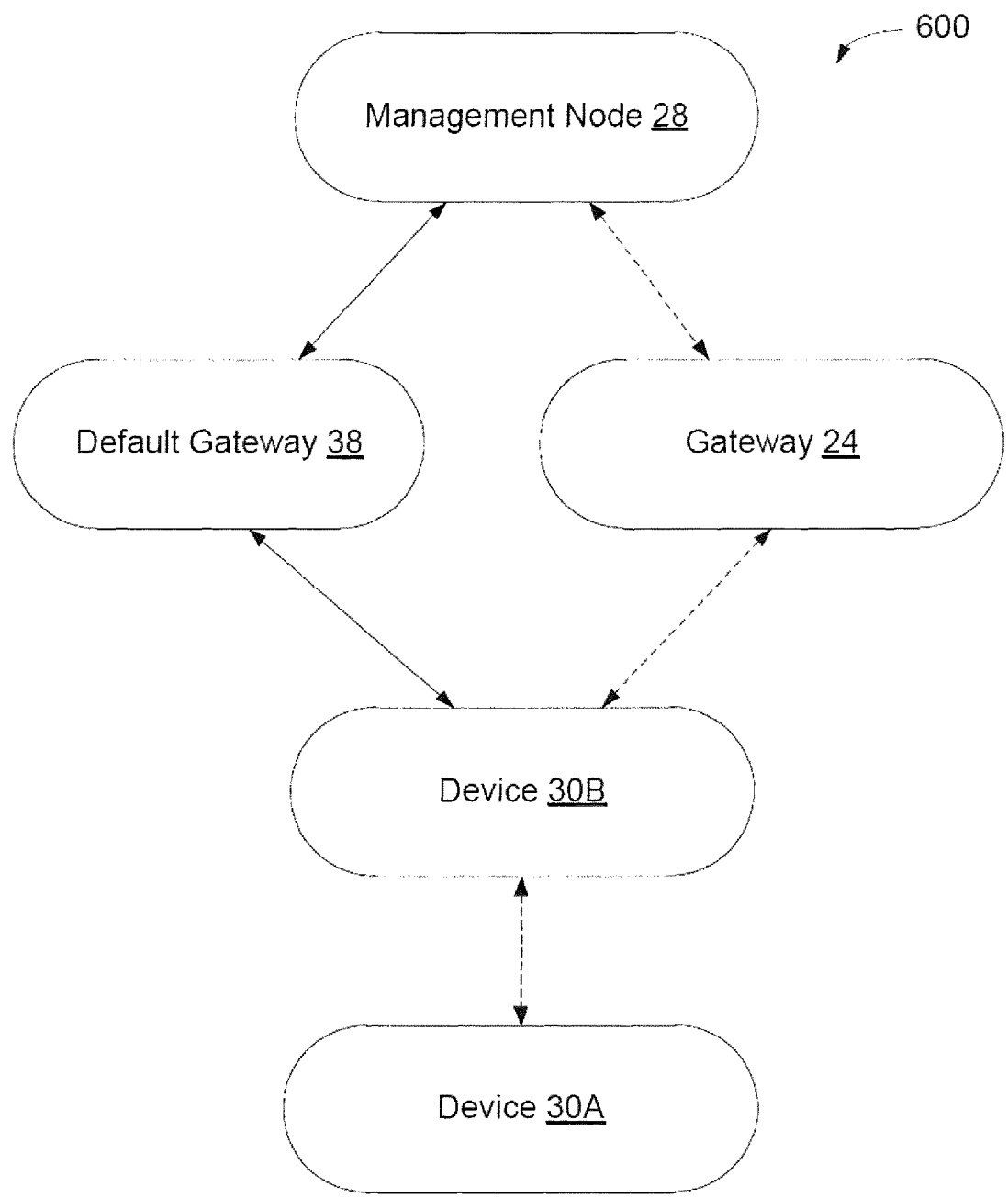
FIG. 6 depicts an example wireless communication network structure that includes a management node and devices in accordance with embodiments herein.

FIG. 6 shows an example wireless communication network structure in accordance with a device assisting a management node to determine an optimal gateway. The given device 30B connects to a default gateway. The management node 28 may determine that the device 30B should stay connected to the default gateway 38. Alternatively, the management node 28 determines that gateway 24 is the optimal gateway and therefore device 30B will reconnect to gateway 24.

Device 30B may assist the management node to determine the optimal gateway by transmitting reachability information indicating that default gateway 38 and gateway 24 are within communication range of device 30B. For instance, device 30B may include identifiers identifying default gateway 38 and gateway 24. Alternatively or additionally, the device 30B may transmit constraint information indicating properties of device 30B.

The device assisting a management node to determine an optimal gateway may be connected directly to a gateway or may connect to a gateway indirectly. FIG. 6 shows a network that may include a device 30A connecting to a gateway indirectly via another device, device 30B, that relays communication. The device 30A may assist the management node to determine an optimal gateway with device 30B relaying device 30A's communication toward the management node 28.

The device providing the assistance data may use various tactics to determine the assistance information. For instance, a device may use an access point scan to determine reachability information. Devices providing an access point (gateways and relay devices) are detectable in access points scans. To find these, a device scans through all frequencies to detect broadcasts sent periodically by access points. Consequently, the device learns which gateways and relay devices it may reach. It may then report this information to the management node 28 to determine which gateways or relays to which it should connect.

In some embodiments, the device determines assistance information by receiving a beacon from an advertising device. The advertising device may be a device that is not connected to the cellular network and is not within communication range of any gateway. The device may transmit a notification to the management node 28 indicating the received beacon. In this way, the device may assist the management node 28 to determine whether the given device should serve as a relay for the advertising device.

In some embodiments, the device in assisting a management node to determine an optimal gateway may assist a management device to determine whether the given device should connect to a cellular network through the initial gateway but via a different relay device in a capillary network.

Additionally, the assistance information may assist a management node to connect to a different gateway by connecting through another device. The other device may already be performing a role as a relay device by relaying communication for another device or may be performing a role as a leaf device in that it does not currently relay traffic for another device. The management node in making determinations based on the assistance data may determine that a given device should switch from one role to another. For example, a leaf device should begin relaying traffic to enable a connecting device to communicate via the leaf device.

The management node 28 may determine based on the assistance information that multiple relays or gateways are good options to which the device should connect. The management node 28 in this case may indicate alternative gateways or alternative sets of relays as options for the device to connect via.

Figure 7:
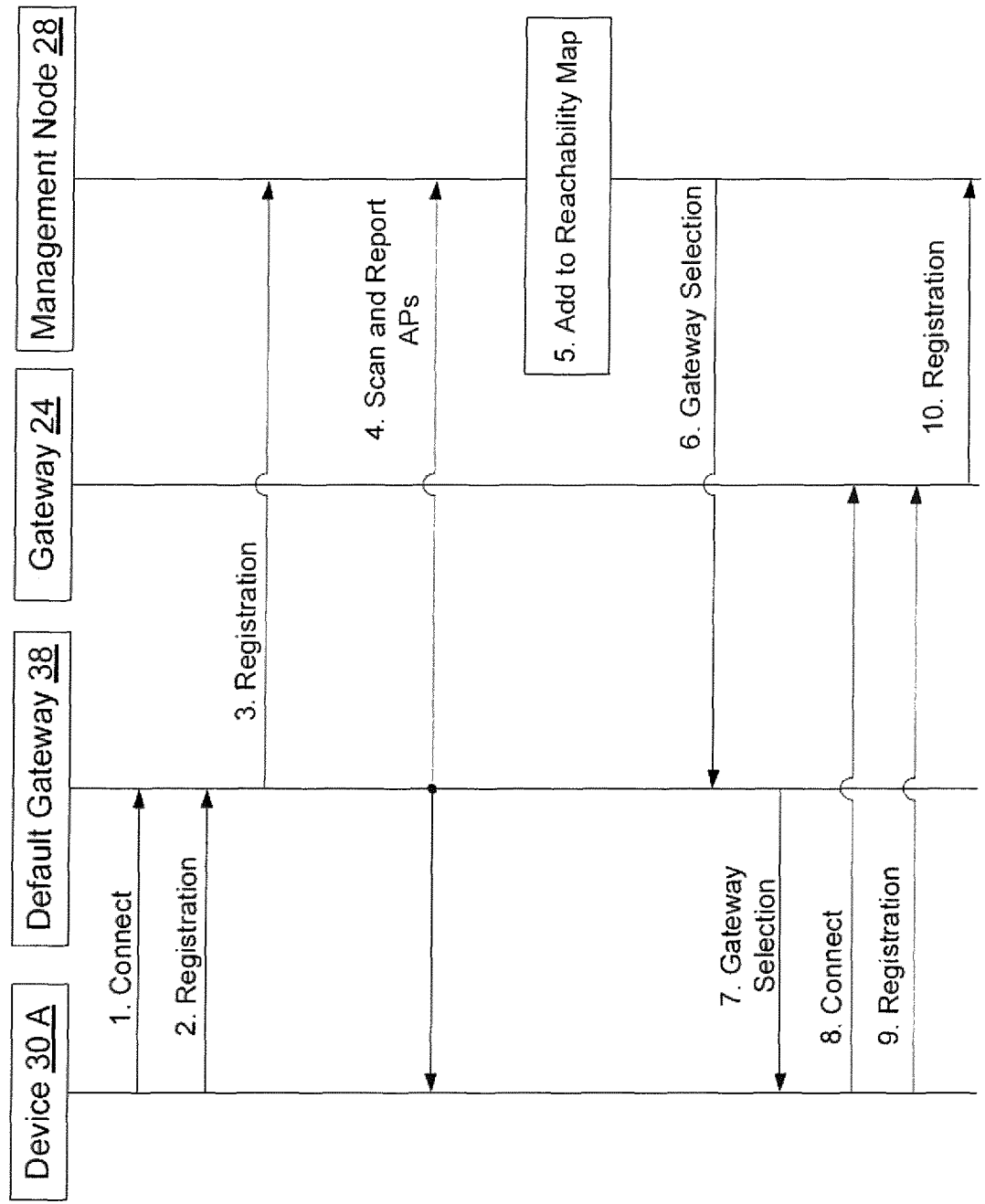
FIG. 7 depicts an example flow diagram of signaling between a management node, gateways and device in accordance with embodiments herein.

FIG. 7 shows an example flow diagram of a device connecting through a default gateway and switching to another gateway based on a management node 28 selecting the optimal gateway.

When a device 30A boots or otherwise attempts to access a cellular network, it (1) selects a default gateway to which it connects. The selection of the default gateway may be via several methods. For example, the device 30A may select a random access point of reachable access points, a preprogrammed access point or iterating through all available access points. The device 30A may optionally use this connectivity for performing bootstrap to a pre-programmed bootstrap server, which provides the address of the current management server, e.g. management node 28.

After the connection, device 30A will send (2) a registration message toward the management node. The registration message in embodiments authenticates the node towards a given gateway. The device 30A in embodiments knows the address of the management node 28 based on connecting to the default gateway. As shown, in FIG. 7, device 30A may use the connectivity to the default gateway 30 for registration to a management server (e.g. management node 28) and to let the management server perform basic management. For instance, as shown in FIG. 7, the default gateway (3) sends registration information to the management node 28. The registration information, for example, informs the management node 28 about the new location in the network of device 30A. This registration allows the management node 28 to keep track of the nodes (e.g. device 30A) in the capillary network(s). The management node 28 in embodiments uses the registration information to perform basic management which includes performing connectivity management as described herein.

In embodiments, the management node 28 performs management by requesting reachability information from connected devices. As shown in FIG. 7, the management node sends a request to a connected device in (4) to scan the access points around it and send back that information. The default gateway forwards this request to connected devices (e.g. device 30A) and reports to management node 28 connected device 30A's response.

The management node 28 uses reported information in (5) to add reported access points to a reachability map (e.g. to update or form a reachability map). In this case, device 30A indicated that default gateway 28 and gateway 24 were within the communication range of device 30A and thus reachable by device 30A. Based on the reachability information, the management node selects a gateway for the default gateway. The management node 28 in (6) sends the selection to the default gateway. This gateway selection is (7) forwarded to device 30A. The management node 28 in embodiments sends a notification or request to the selected gateway.

The device 30A uses the selected gateway to (8) connect to the default gateway. The gateway 24 may then (9) receive and (10) forward registration information from device 30A to management node 28. In embodiments, the device 30A registers again to authenticate device 30A toward a different gateway (gateway 24) and update the management node about the new location of the device 30A (i.e. that device 30A is now connected to another gateway).

The management node 28 in embodiments determines or learns of a topology to make connectivity decisions (e.g. learns reachability or possible connectivity between pairs of devices and between devices and capillary gateways). FIG. 5 and FIG. 7 is an example method and flow diagrams, respectively, in which a management node 28 learns of a given topology. Other methods for determining a topology include embodiments where a device connecting to a capillary network advertises a need for connectivity (e.g. by transmitting a beacon). Thus, embodiments include multiple methods for detecting surrounding nodes (e.g. beacons and access point scans).

Figure 8:
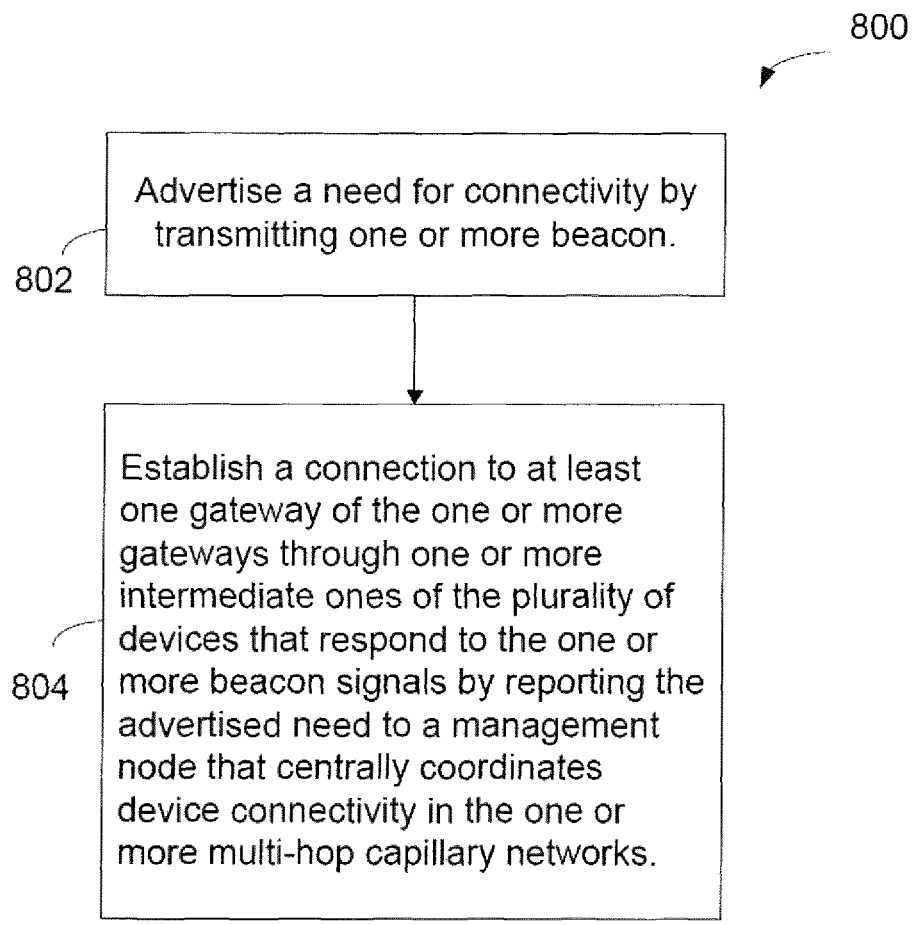
FIG. 8 depicts an example method implemented by a device in accordance with embodiments herein.

FIG. 8 shows an example method related to advertising a need for connectivity. The method is implemented in a device of a capillary network (e.g. capillary network(s) 16 of FIG. 1). The device advertises a need for connectivity by transmitting one or more beacons. (Block 802). The device establishes a connection to at least one gateway of the one or more gateways through one or more intermediate ones (e.g. devices 34 of FIG. 1) of the plurality of devices that respond to the one or more beacon signals by reporting the advertised need to a management node (e.g. management node 28 of FIG. 1). (Block 804). The management node centrally coordinates device connectivity in the one or more multi-hop capillary networks.

A device advertising a need for connectivity may be the same device that is configured to implement the method 500 in FIG. 5 or a different device. The device may be a connected device or an unconnected device in a capillary network. For example, a connected leaf device may transmit beacons to have other options for connectivity. Since the connected leaf device is not an access point, it transmits beacons to be detectable to other neighbors in which it may connect. For instance, a leaf node may periodically broadcast beacons. Alternatively, if a node cannot detect any access points, it will start sending beacons. Regardless, the beacon messages indicate that the device needs connectivity.

In embodiments, the frequency of beacon broadcast is the same or different depending on whether the leaf node is connected or not. For example, frequency of broadcasts from a given leaf node that is connected is higher than a leaf node that is not connected. In this way, the relay nodes and gateways learn which leaf nodes it may reach. This information may then be reported to a management node for controlling connectivity for the advertising device.

In embodiments, a connected device that detects or listens to the beacon will try to inform a management node about the necessity to connect to the unconnected device.

For a connected device using beacons to advertise a need for connectivity, the connected device in embodiments assists a management node to determine whether the connected device should re-connect to the cellular network. For instance, if the connected device is connected to a gateway through intermediate devices in the capillary network configured to relay traffic to the gateway from the connected device, the connected device may assist a management node to determine other different intermediate devices to connect via the same gateway or a different gateway. The connected device does so by transmitting reachability information to the management node that identifies other nodes of which the given device is within communication range.

In embodiments, devices that hear the beacons update their own reachability information. For example, a device maintains a list of reachable nodes. When there is a change in the list, a message is transmitted to the management node containing a list of reachable nodes. Alternatively, where the node reports information periodically, the node in embodiments waits to inform the management node until the time for periodic reporting. Either way, the management node learns the potential connections in the whole network and the management node has fresh information about the structure of the network.

Figure 9:
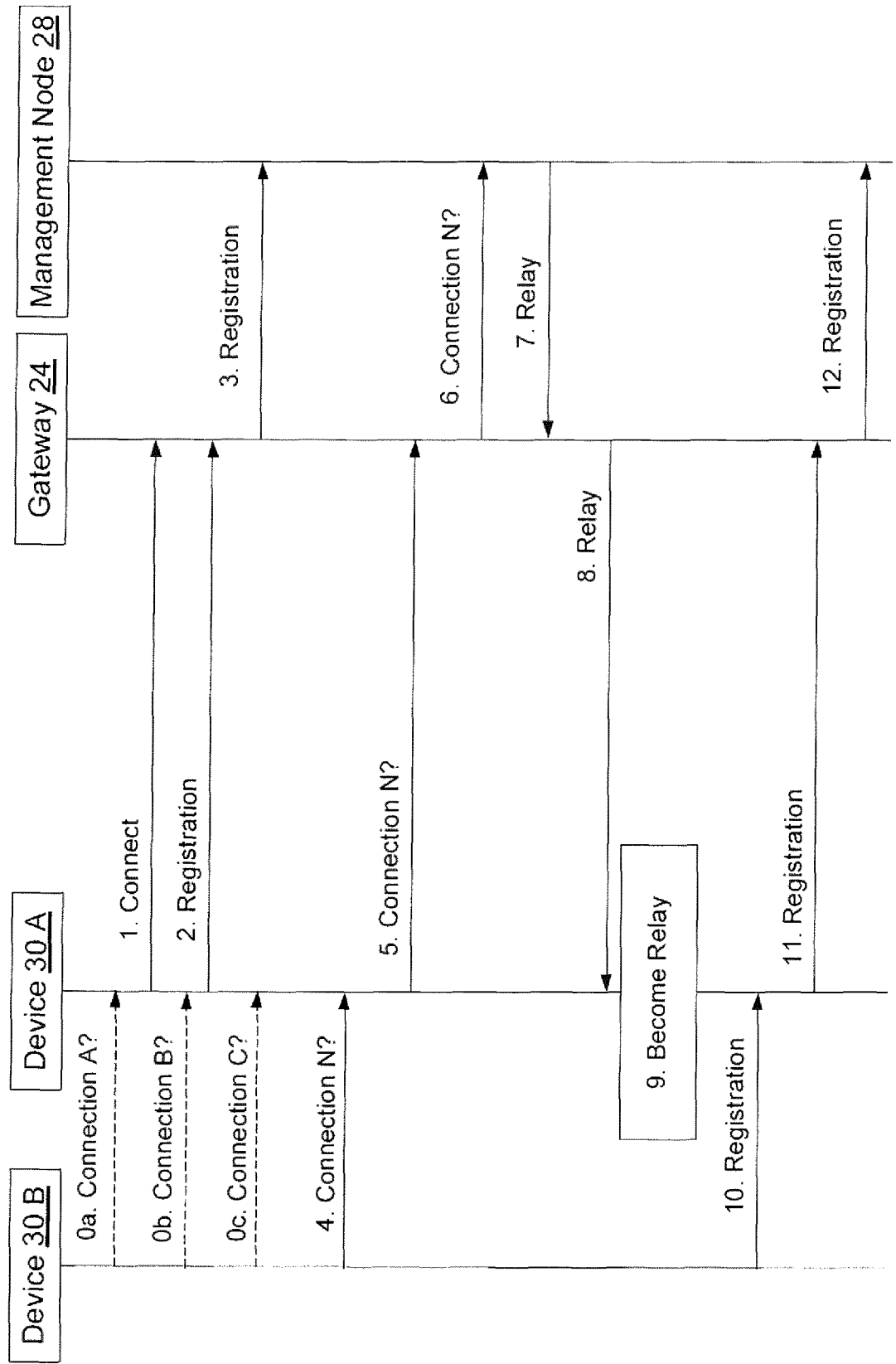
FIG. 9 depicts an example flow diagram of signaling between a management node, a gateway and devices in accordance with embodiments herein.

FIG. 9 shows an example flow diagram for signaling for a device 30B advertising, toward a management node 28, a need for connectivity. A device advertising a need for connectivity may begin transmitting beacons advertising that need at any point in time irrespective of whether there is a connected device in communication range (e.g. $0_A$, $0_B$, $0_C$ or $0_N$). The advertising device may be a connected or unconnected leaf node. Device 30A is within range of device 30B, but is unconnected for a period of time and thus fails to communicate that beacon to the management node 28. Device 30A begins the process of (1) connecting and (2)-(3) registering to a management node 28. Such connection and registration may be a connection and registration process as explained above. For example, device 30A connects and registers to gateways 24 as explained with respect to FIG. 7 in (8)-(10). Once device 30A is connected and (4) receives a beacon advertising a request (e.g. Connection N), device 30A decides to inform the management node 28 about the need of device 30B to connect to a capillary gateway. In some embodiments, the advertising is multicast to the network and other nodes nearby also receive the beacon. These other nodes may also inform the management node 28 about the need of device 30B to connect to a capillary gateway. In some embodiments device 30A's decision making about informing the management node 28 of device 30B can be dependent on priorities of device 30A. For example, if device 30A is about to go to sleep it may decide not to inform or may wait to inform the management node 28 about device 30B.

Device 30A in (5) communicates that need for a connection to its gateway 24. The gateway 24 in (6) forwards this connection information to the management node 28. The management node 28 after receiving that information, tells device 30A to become a relay via gateway 24 in (7) and (8). At (9) device 30A becomes a relay to host device 30B. Device 30B is now connected via Device 30A. Device 30B registers with management node 28 via device 30A and gateway 24 in (10)-(11).

Figure 10:
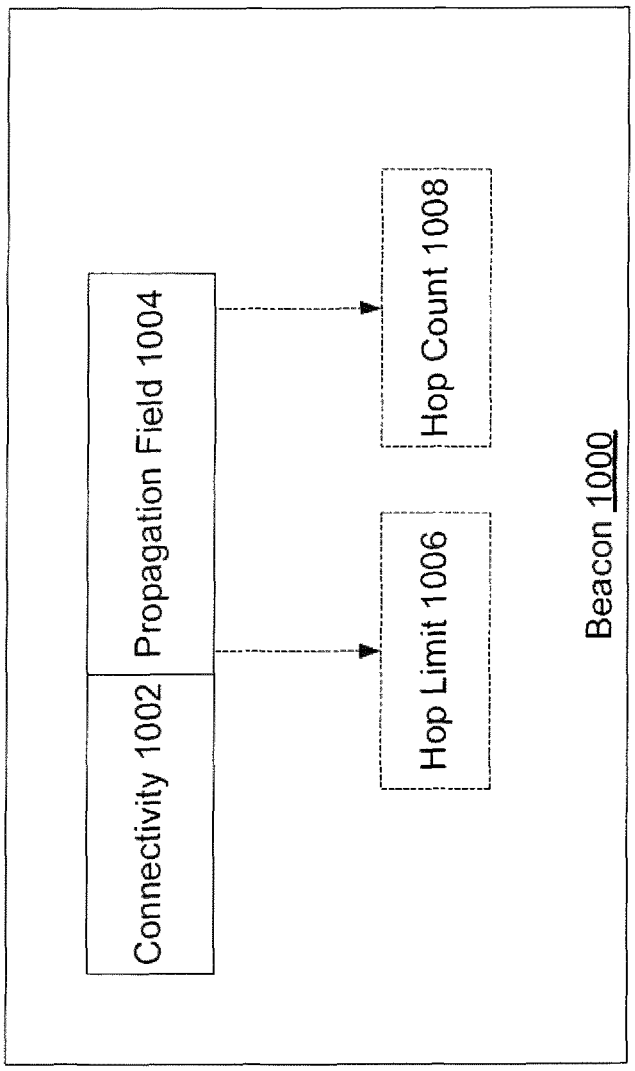
FIG. 10a and FIG. 10b depict example beacon messages in accordance with embodiments herein.

FIG. 10a shows an example beacon to advertise a need for connectivity. The beacon 1000 (e.g. a HELLO message) contains one or more connectivity fields 1002 for advertising a need for connectivity and one or more propagation fields 1004 indicating to a recipient of the message that the message should not be retransmitted. Limiting the propagation of the message ensures that a recipient of a message is within a communication range rather than simply receiving a relayed message from a device within the communication range. For example, the propagation field may include two fields such as a hop limit 1006 and hop count 1008. If the hop limit is set to 1 and the hop count is set to 0, the message would not be transmitted.

As described in IETF RFC 6130, a node (e.g. an unconnected leaf node) may use the Mobile Ad Hoc Network (MANET) Neighborhood Discovery Protocol (NHDP) to send an IP beacon. That discovery protocol contains a signaling mechanism to transfer beacons to other nodes. The signaling consist of a single type of message, known as a HELLO message.

HELLO messages are instances of IETF RFC5444 messages, and this protocol supports any combination of message header options and addresses. As a consequence, there is no single way to represent how all HELLO messages look.

Embodiments extend a HELLO message to support a beacon according to embodiments herein. FIG. 10b shows such an example extended HELLO message beacon 1000. The beacon 1100 may be an IP beacon (e.g. IPv4 address) that will inform the receiving node(s) that there is a node that needs connectivity in the capillary network. The Hello message may have various fields based on an octet (8 bit) structure as shown in FIG. 10b. A single octet may contain more than one field (e.g. octet 1110) or a field may span more than one octet (e.g. octets block 1112).

According to FIG. 10b, HELLO octet 1108 indicates it is a HELLO message. Octet 1110 indicates both a Message Flags (MF) field and Message Address Length (MAL). The Message Flags field component of octet 1110 may indicate the message header contains hop limit (octet 1104), hop count (octet 1106), and message sequence number fields (octet block 1114) (e.g. if the Message Flags field contains a value of 7). The MAL field component of octet 1110 may indicate addresses in the message have a length of four octets (e.g. if the MAL field contains the value of 3). The message also includes a Hop Limit field (octet 1116) and a Hop Count field (octet 1118).

The message is extended to contain, for example, a new Message TLV Block of type Connectivity (octet 1120), which uses a Message TLV with Flags octet (MTLVF) value 0 (octet 1122). The particular names of the extended fields are irrelevant. Both parameters are just an example of how a HELLO message may be extended with some small modifications to allow the possibility to advertise to other nodes in the network a devices needs to connect to a capillary gateway.

Figure 11:
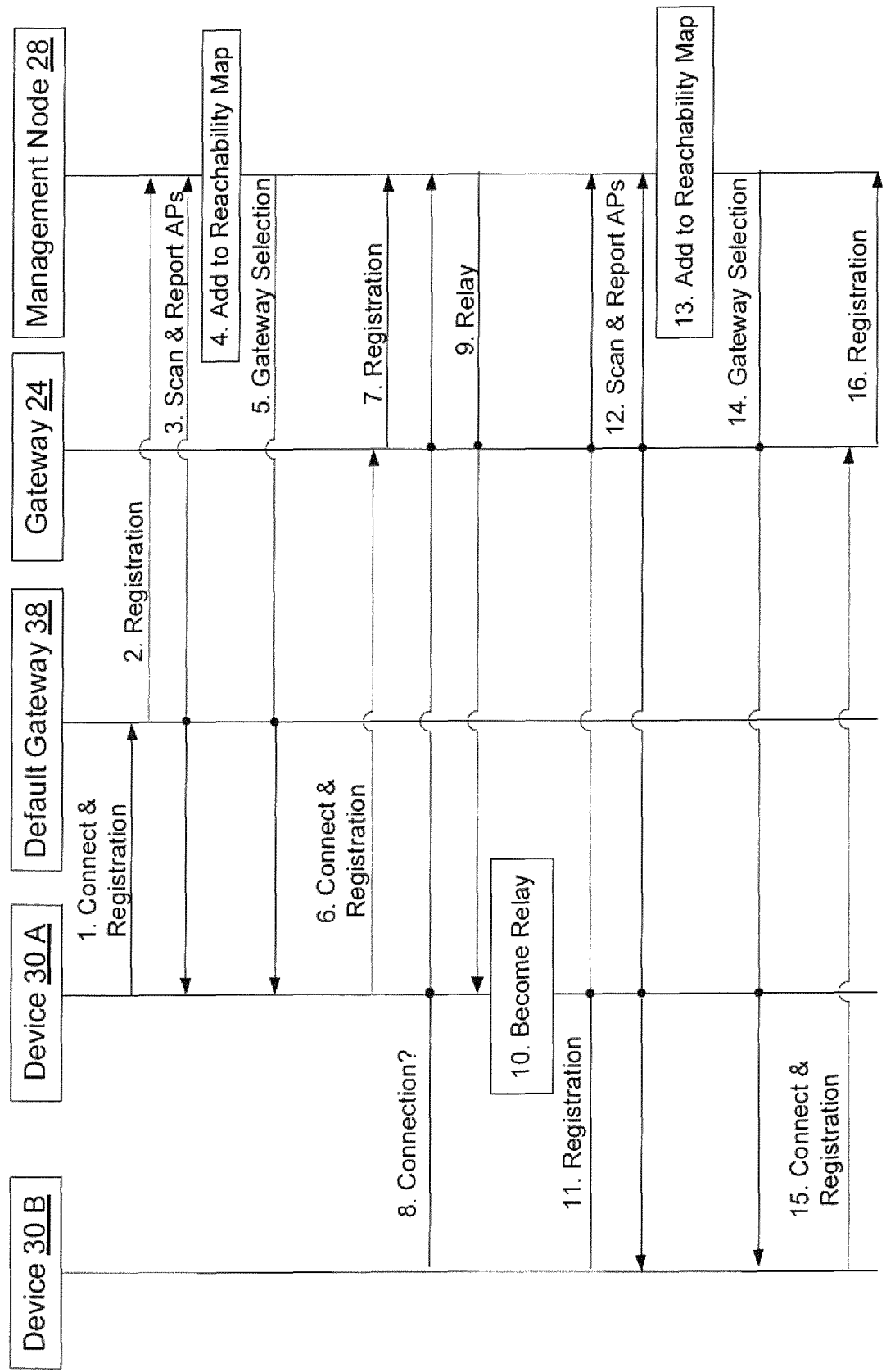
FIG. 11 depicts an example flow diagram of signaling between a management node, a gateway and devices in accordance with embodiments herein.

FIG. 11 shows an example method of signaling between several gateways and devices in a capillary network in accordance with embodiments herein. In particular, it is an example on how a leaf node becomes a relay node and how another leaf node connects to a capillary gateway through that relay node.

First, after device 30A (currently a leaf node) boots, it selects (1) the default gateway 38 to which it connects and sends a registration message to the management node 28. The default gateway 38 in (2) forwards the registration request to management node 28. The management node 28 in (3) will tell the device 30A to scan the access points around it and send back that information via default gateway 38. Default gateway 38 receives the scan request from the management node 28 and forwards the request to device 30A. It also receives device 30A's response and forwards that to the management node 28. The management node will add the availability of the networks around the leaf node to its reachability map in (4) and will choose a capillary gateway for the leaf node in (5). The selection is forwarded via the default gateway 38. Once device 30A receives the gateway selection, it disconnects from the default gateway and connect and register in (6) to gateway 24, the gateway specified by the management node 28. After that, the device 30A will register in (7) through the new gateway 24 to the management node 28.

When the device 30A receives a beacon in (8) from device 30B, it decides to inform the management node about the need of device 30B to connect to a capillary gateway via gateway 24. The management node 28, immediately after receiving that information, tells device 30A to become a relay in (9) via gateway 24 and to host the unconnected relay leaf.

The device 30B registers in (11) with the management node 28 via gateway 24. The management node 28 requests devices in the topology to scan and report access points. In particular, it tells device 30B to scan and report via device 30A and gateway 24 in (12). The management node updates its reachability map in (13). It signals its gateway selection in (14) which happens to be the default gateway for device 30B, and the device 30B connects and registers to the gateway 24 in (15). Device 30B also registers with the management node 28 via the gateway 24 in (16).

Those of ordinary skill in the art will appreciate that messages depicted as individual signaled messages in the flow diagrams of FIGS. 7, 9 and 11 may be sent in aggregated messages or sent in multiple messages.

In some embodiments, the long-range radio access technology includes one or more 3rd Generation Partnership Project standards such as Long Term Evolution (LTE), Wideband Code Division Multiple Access (W-CDMA), or Global System for Mobile Telecommunications (GSM).

In some embodiments the short-range access technology comprises one or more variants of Wi-Fi (e.g. 802.11 a/b/g/n, 802.11 ah, etc.), all 802.15.4 based technology including ZigBee, traditional Bluetooth, Bluetooth Low Energy, ANT, Dash7, WirelessHART, Z-Wave, ISA 100.11a and IoT protocols (such as CoAP or MQTT). Of course, these are only examples, and it is understood that other standards and radio access technologies may be used.

In some embodiments, e.g. FIG. 1, the management node 28 manages devices in a single capillary network(s) 16. Those of ordinary skill in the art will appreciate that the centralized approach has advantages in economies of scale. For instance, the capillary network(s) 16 may be one of several constrained networks. The management node 28 would then have the choice to manage devices that belong to other constrained networks or other capillary networks. For instance, a single management node 28 may manage in a unified way several capillary networks that are not directly connected to each other (e.g. Wi-Fi networks in different buildings). As another example, operators may manage multi-hop short-range networks that are provided by other users. Further, a radio access network (e.g. RAN 14) may contain multiple base stations for communication to one or more constrained networks or other long-range wireless devices.

In some embodiments, the management node 28 is connected to the core network 12 via a packet data network (PDN) 18 (e.g. a wide-area network such as the Internet). Alternatively, the management node 28 may reside in the cellular network, or may even be part of a capillary gateway in some embodiments.

In one or more embodiments, devices in the capillary network use an Open Mobile Alliance Device Management (OMADM) protocol to communicate with a management node and/or to communicate with each other. However, other protocols may be used in some embodiments.

Figure 12:
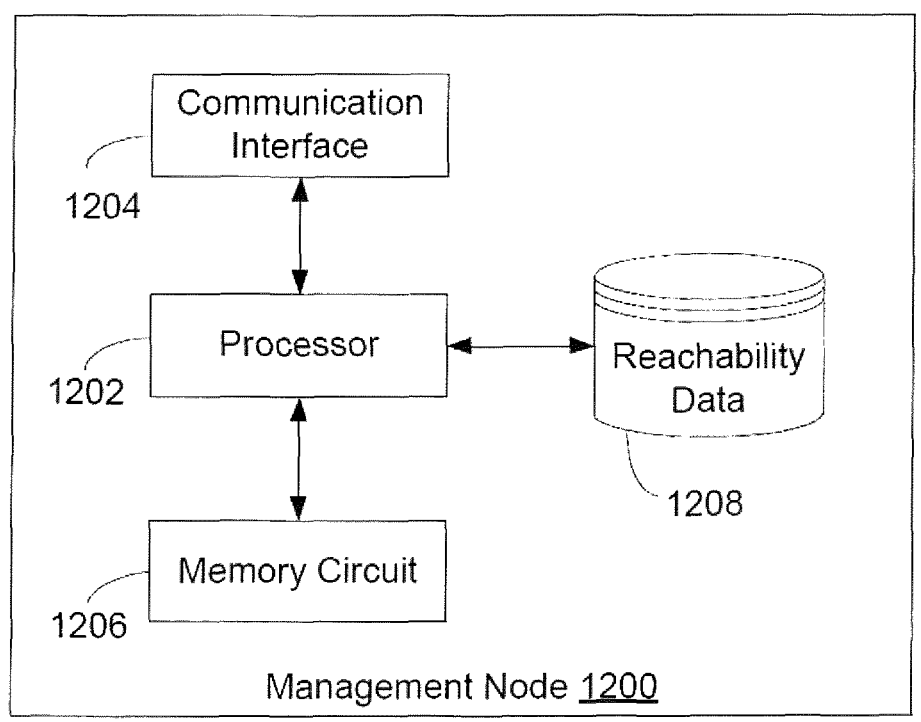
FIG. 12 depicts an example management node in accordance with embodiments herein.

FIG. 12 illustrates an example management node 1200 for managing connectivity between a cellular network 15 and a plurality of devices 26 in one or more multi-hop capillary networks 16. One or more gateways (e.g. gateways 24A and 24B) connect the capillary network(s) 16 to the cellular network 15. The management node 1200 may be used as the management node 28 in FIG. 1 and to implement the method 200. The management node includes one or more processing circuits (shown as "processor" 1202), a communication interface 1204, a memory circuit 1206, and a repository of reachability data 1208. The processor 1202 may include one or more microprocessors, microcontrollers, digital signal processors, or the like, for example. The memory circuit 1206 may store instructions for storing programs and data used by the processor 1202. The communication interface 1204 facilitates communication between the management node 1200 and nodes in capillary network(s) 16 (e.g. devices 26A and 26B and capillary gateways 24). The communication interface 1204 may include a radio transceiver in some embodiments (e.g. configured according to one or more 3GPP or 802.11 standards) and/or may include an Ethernet interface, for example. The repository 1208 of reachability data stores reachability data received from devices 26 and gateways 24 in the capillary network(s) 16.

The one or more processing circuits of processor 1202, which are operatively connected to the memory circuit 1206, are configured to determine a topology of capillary network(s) 16 based on reachability information received from the plurality of devices (e.g. relay devices 34, devices 26A and 26B). The topology indicates which devices are within communication range of other devices and gateways in the capillary network(s) 16. The plurality of devices use short-range radio access technology, the cellular network uses long-range radio access technology, and the gateways use long-range radio access technology and short-range radio access technology.

For a first device (e.g. device 26B of FIG. 1) that is within communication range of at least one gateway (e.g. gateway 24B of FIG. 1), the one or more processing circuits of processor 1202 are configured to determine which of the gateways the first device should use to connect to the cellular network(s) based on the determined topology; and transmit a notification to the first device that indicates the determined gateway.

For a second device (e.g. device 24A of FIG. 1) that is not within communication range of any of the gateways, the one or more processing circuits of processor 1202 are configured to determine a set of one or more of the plurality of devices (e.g. devices 34), including at least one device that is within communication range of at least one of the gateway, to relay traffic between the second device and one of the gateways, based on the determined topology; and transmit a notification to the second device that indicates the determined set.

In one or more embodiments, the memory circuit 1206 contains instructions executable by said processor 1202 whereby the management node 1200 is operative to implement one or more methods and/or embodiments described herein (e.g. method 200).

Figure 13:
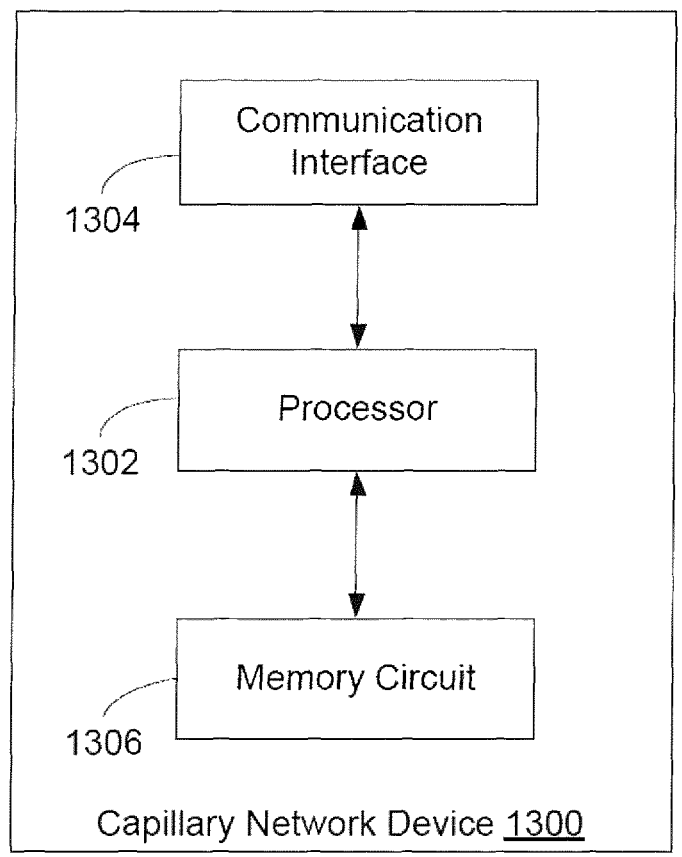
FIG. 13 depicts an example capillary network device in accordance with embodiments herein.

FIG. 13 illustrates an example capillary network device 1300 that may be used as a given device (e.g. 26A, 26B of FIG. 1) and may be used to implement the method 500 and/or the method 800 in FIG. 5 and FIG. 8, respectively. The given device 1300 includes one or more processing circuits (shown as "processor" 1302), a communication interface 1304, a memory circuit 1306. The processor 1302 may include one or more microprocessors, microcontrollers, digital signal processors, or the like, for example. The memory circuit 1306, which is operatively connected to the processor 1302, may store instructions for storing programs and data used by the processor 1302. The communication interface facilitates communication between the device 1300 and nodes in a capillary network (e.g. other devices 26A, 26B, other relay devices 34, and capillary gateways 24A, 24B). The given device is one of a plurality of devices (e.g. devices 26A, 26B) in multi-hop capillary network(s) 16. The plurality of devices use short-range radio access technology, the cellular network 15 uses long-range radio access technology, and the one or more gateways use long-range radio access technology and short-range radio access technology.

According to one aspect of the present disclosure, the one or more processing circuits of processor 1302 of the given device 1300 are configured to connect to cellular network 15 through a default one of a plurality of gateways 24B in the multi-hop capillary network(s) 16 that is connected to the cellular network 15. The one or more processing circuits are further configured to assist management node 28 to determine whether the given device should re-connect to the cellular network through a different one 24A of the plurality of gateways, by transmitting reachability information to the management node 28 that indicates reachability between the given device.

According to another aspect of the present disclosure, the one or more processing circuits 1302 of the given device 1300 are configured to advertise a need for connectivity by transmitting one or more beacons (1000); and establish a connection to at least one gateway (e.g. gateway 24A) of the one or more gateways through one or more intermediate ones (e.g. relay devices 34) of the plurality of devices that respond to the one or more beacon signals by reporting the advertised need to a management node (e.g. management node 28). The management node centrally coordinates device connectivity in the capillary network(s) 16. As in the embodiments described above, the plurality of devices use short-range radio access technology, the cellular network uses long-range radio access technology, and the gateway(s) use long-range radio access technology and short-range radio access technology.

In one or more embodiments, the memory circuit 1306 contains instructions executable by said processor 1302 whereby the given device 1300 is operative to implement one or more methods and/or embodiments described herein (e.g. method 500 and method 800).

| Abbreviations | |
|---|---|
| Abbreviation | Explanation |
| AP | Access Point |
| BLE | Bluetooth Low Energy |
| CoAP | Constrained Application Protocol |
| GSM | Global System for Mobile Telecommunications |
| HTTP | Hypertext Transfer Protocol |
| IoT | Internet of Things |
| IP | Internet Protocol |
| LTE | Long Term Evolution |
| M2M | Machine to Machine |
| MANET | Mobile Ad Hoc Network |
| MQTT | Message Queue Telemetry Transport |
| NHDP | Neighborhood Discovery Protocol |
| OMADM | Open Mobile Alliance Device Management |
| PDN | Packet Data Network |
| RAN | Radio Access Network |

What is claimed is:

1. A method of managing connectivity between a cellular network and a plurality of devices in one or more multi-hop capillary networks, wherein one or more gateways connect the one or more multi-hop capillary networks to the cellular network, the method implemented in a management node connected to the cellular network via a packet data network, the method comprising:
   determining, at the management node, a topology of the one or more multi-hop capillary networks based on reachability information received from at least one of the plurality of devices, wherein the topology indicates which devices are within communication range of other devices and gateways in the one or more capillary networks;
   for a first device that is within communication range of at least one gateway:
      determining, at the management node, which gateway the first device should use to connect to the cellular network based on the determined topology; and
      transmitting a notification to the first device that indicates the determined gateway; and
   for a second device that is not within communication range of any gateway:
      determining, at the management node, a set of one or more of the plurality of devices, including at least one device that is within communication range of at least one gateway, to relay traffic between the second device and a gateway, based on the determined topology; and
      transmitting a notification to the second device that indicates the determined set;
   wherein the determining which gateway the first device should use to connect to the cellular network is further based on constraint information defining one or more properties of the first device and/or constraint information defining one or more properties of the at least one gateway of which the first device is within communication range;
   wherein the determining of the set of one or more of the plurality of devices to relay traffic is further based on constraint information defining one or more properties of the devices in the set and/or constraint information defining one or more properties of at least one gateway that is within communication range of a device in the set; and
   wherein the determining which gateway the first device should use to connect to the cellular network, the determining of the set of one or more of the plurality of devices to relay traffic, or both, is further based on a policy of the management node that comprises a set of rules defining how to connect the plurality of devices to the cellular network based on the constraint information.

2. The method of claim 1, wherein the reachability information received from a given device of the plurality of devices comprises an identifier of each node of which the given device is within communication range, wherein an identified node is one of the plurality of devices or one of the one or more gateways.

3. The method of claim 2, wherein the reachability information further comprises either a signal strength or a signal quality metric measured by the given device for each identified node.

4. The method of claim 1, further comprising, if the reachability information from a given device is received via a current gateway that is different than the determined gateway for the device, transmitting a request to the device to disconnect from the current gateway and connect to the cellular network via the determined gateway.

5. The method of claim 1, wherein the constraint information defines a battery level, a load level, and/or a latency for a device or gateway.

6. The method of claim 1, further comprising subsequently re-determining a gateway that a given device should use to connect to the cellular network, or re-determining the set of devices to relay traffic between a given device and one of the gateways, based on receiving at least one of updated reachability and updated constraint information.

7. The method of claim 6, wherein the updated constraint information defines a battery level, a load level, and a latency for a device or gateway.

8. The method of claim 1, further comprising:
receiving a notification indicating that a given device has detected a beacon advertising that the second device needs connectivity; and
based on the notification, transmitting a request to the given device to act as a relay for the second device;
wherein the given device is one of the plurality of devices that is connected to one of the gateway nodes either directly, or via one or more of the plurality of devices acting as relays.

9. The method of claim 1, wherein the one or more multi-hop capillary networks include a plurality of gateways, the method further comprising:
determining an alternate gateway from the plurality of gateways that the first device may choose from to connect to the cellular network;
wherein the notification that indicates the determined gateway also indicates the alternate gateway.

10. The method of claim 1, further comprising, for the second device:
determining an alternate set of one or more of the plurality of devices that the second device may choose from to relay traffic to a gateway;
wherein the notification that indicates the set of devices to relay traffic also indicates the alternate set.

11. The method of claim 1, further comprising determining, based on the topology, that one of the plurality of devices should switch from relaying traffic for another device to not relaying that traffic, or vice versa, and transmitting a command to that device indicating that the device should perform said switch.

12. The method of claim 1, wherein a long-range radio access technology for the cellular network comprises one or more 3rd Generation Partnership Project (3GPP) radio access technologies, and wherein a short-rage radio access technology for the plurality of devices comprises one or more of Wi-Fi, Bluetooth, Bluetooth Low Energy, and Zigbee.

13. A management node connected to a cellular network via a packet data network, the management node for managing connectivity between the cellular network and a plurality of devices in one or more multi-hop capillary networks, wherein one or more gateways connect the one or more multi-hop capillary networks to the cellular network, the management node comprising a processor and a memory, said memory containing instructions executable by said processor whereby said management node is operative to:
determine a topology of the one or more multi-hop capillary networks based on reachability information received from at least one of the plurality of devices, wherein the topology indicates which devices are within communication range of other devices and gateways in the one or more capillary networks;
for a first device that is within communication range of at least one gateway:
determine, which gateway the first device should use to connect to the cellular network based on the determined topology; and
transmit a notification to the first device that indicates the determined gateway; and
for a second device that is not within communication range of any gateway:
determine a set of one or more of the plurality of devices, including at least one device that is within communication range of at least one gateway, to relay traffic between the second device and a gateway, based on the determined topology; and
transmit a notification to the second device that indicates the determined set;
wherein the determining which gateway the first device should use to connect to the cellular network is further based on constraint information defining one or more properties of the first device and/or constraint information defining one or more properties of the at least one gateway of which the first device is within communication range;
wherein the determining of the set of one or more of the plurality of devices to relay traffic is further based on constraint information defining one or more properties of the devices in the set and/or constraint information defining one or more properties of at least one gateway that is within communication range of a device in the set; and
wherein the determining which gateway the first device should use to connect to the cellular network, the determining of the set of one or more of the plurality of devices to relay traffic, or both, is further based on a policy of the management node that comprises a set of rules defining how to connect the plurality of devices to the cellular network based on the constraint information.

14. A non-transitory computer readable medium storing a computer program product for controlling a management node connected to a cellular network via a packet data network, said management node configured to manage connectivity between the cellular network and a plurality of devices in one or more multi-hop capillary networks, wherein one or more gateways connect the one or more multi-hop capillary networks to the cellular network, the computer program product comprising instructions which, when executed on at least one processor in the management node, cause the at least one processor to:
determine, at the management node, a topology of the one or more multi-hop capillary networks based on reachability information received from at least one of the plurality of devices, wherein the topology indicates which devices are within communication range of other devices and gateways in the one or more capillary networks;
for a first device that is within communication range of at least one gateway:
determine, at the management node, which gateway the first device should use to connect to the cellular network based on the determined topology; and
transmit a notification to the first device that indicates the determined gateway; and
for a second device that is not within communication range of any gateway:

determine, at the management node, a set of one or more of the plurality of devices, including at least one device that is within communication range of at least one gateway, to relay traffic between the second device and a gateway, based on the determined topology; and transmit a notification to the second device that indicates the determined set;

wherein the determining which gateway the first device should use to connect to the cellular network is further based on constraint information defining one or more properties of the first device and/or constraint information defining one or more properties of the at least one gateway of which the first device is within communication range;

wherein the determining of the set of one or more of the plurality of devices to relay traffic is further based on constraint information defining one or more properties of the devices in the set and/or constraint information defining one or more properties of at least one gateway that is within communication range of a device in the set;

wherein the determining which gateway the first device should use to connect to the cellular network, the determining of the set of one or more of the plurality of devices to relay traffic, or both, is further based on a policy of the management node that comprises a set of rules defining how to connect the plurality of devices to the cellular network based on the constraint information.

15. The management node of claim 13, wherein the constraint information defines a battery level, a load level, and/or a latency for a device or gateway.

16. The non-transitory computer readable medium of claim 14, wherein the constraint information defines a battery level, a load level, and/or a latency for a device or gateway.

* * * * *